United States Patent [19]

Hecht

[11] 3,903,858
[45] Sept. 9, 1975

[54] CRANKCASE FUMES TREATMENT
[75] Inventor: Victor Hecht, Haysville, Kans.
[73] Assignee: C. Wayne Stearns, Haysville, Kans.
[22] Filed: Apr. 23, 1973
[21] Appl. No.: 353,904

[52] U.S. Cl. ............... 123/119 B; 55/319; 137/171
[51] Int. Cl. ........................................... F02m 25/06
[58] Field of Search ............... 123/119 B; 137/171; 55/439, 319, 466

[56] References Cited
UNITED STATES PATENTS

| | | | |
|---|---|---|---|
| 1,339,465 | 5/1920 | Luke | 123/119 B |
| 2,166,720 | 7/1939 | Gorleski | 123/119 B |
| 3,073,293 | 1/1963 | Barker | 123/119 B |
| 3,151,604 | 10/1964 | Walker et al. | 123/119 B |
| 3,299,873 | 1/1967 | Bruenn | 123/119 B |
| 3,721,069 | 3/1973 | Walker | 55/319 |

*Primary Examiner*—Charles J. Myhre
*Assistant Examiner*—Sheldon Richter
*Attorney, Agent, or Firm*—John H. Widdowson

[57] ABSTRACT

A fumes treater has a trap connected to the engine crankcase and to the intake manifold. The trap separates liquid and gaseous portions of vapors passed thereinto. The apparatus has a heat exchanger in the engine exhaust manifold, such being connected in the conduit from the trap to the intake manifold to heat vapors passing therethrough.

1 Claim, 4 Drawing Figures

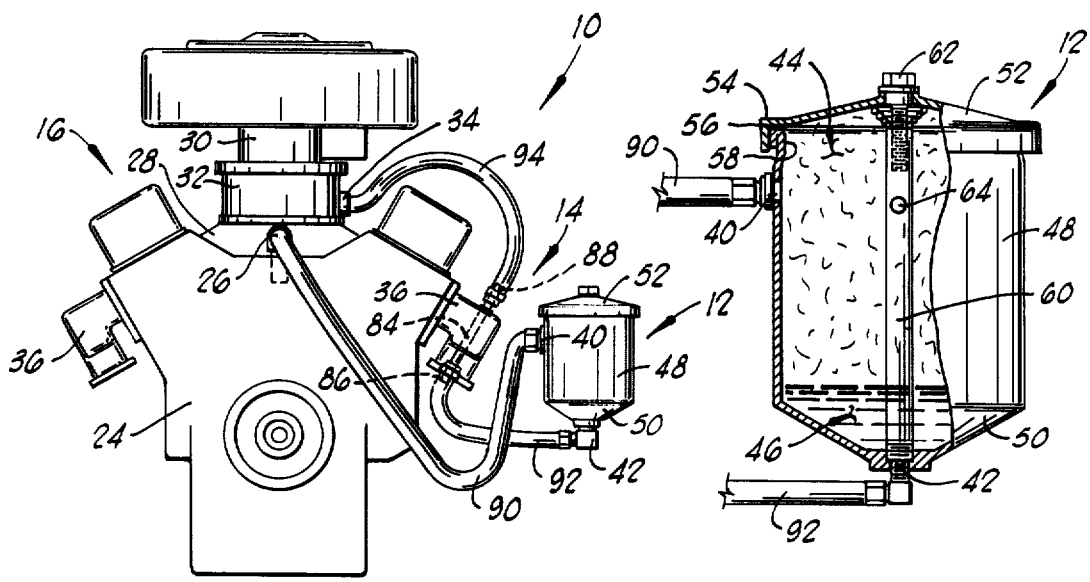
FIG. 1
FIG. 3
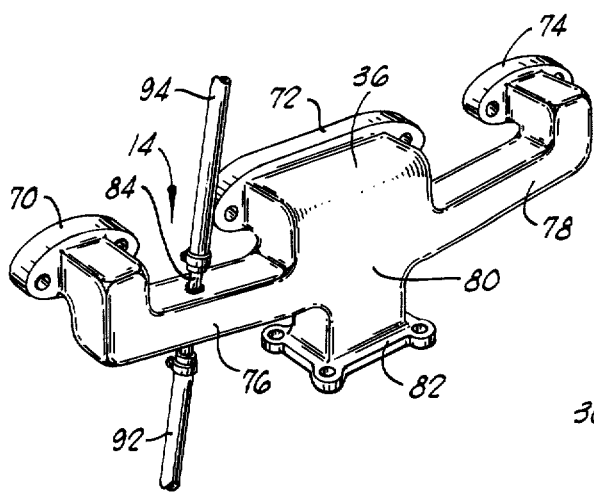
FIG. 4
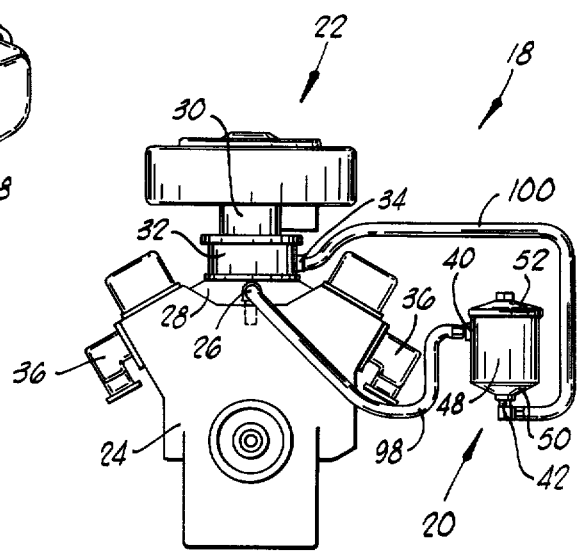
FIG. 2

CRANKCASE FUMES TREATMENT

Numerous devices are known to the prior art which function to remove crankcase vapors from the crankcase of an internal combustion engine and pass same into the air intake of the engine or into the intake manifold thereof. For the most part, these crankcase vapors handling devices circulate the vapors from the crankcase into the intake manifold without treating the vapors. In as much as the crankcase vapors are comprised of substantially non-combustial materials such as atomized oil and so called cludge or heavy hydrocarbons particles resulting from operation of the engine. In the normal operation of a reciprocating internal combustion engine there is a certain amount of crankcase vapors are always present, these consist on part of gaseous combustion products enterning the crankcase by passing between the pistons in the cylinder walls and passing between the valve guides and the valve stems. This particular portion of the crankcase vapors are often referred to as "blow-by." For reasons of reducing air pollution due to operation of such engines, these crankcase vapors should be treated before their direct introduction into the atmosphere. Some apparatus for treating crankcase vapors provide for directly moving the crankcase vapor from the crankcase into the intake manifold of the engine. While this removes the crankcase vapors from the engine, it does not substantially reduce the hydrocarbon exhaust pollution due to the crankcase vapors as they pass through the engine without significant combustion before they are introduced into the atmosphere. Some apparatus before treating crankcase vapors utilize an indirect exhaust manifold heat exchanger to warm the vapors before they are introduced into the intake portion of the engine. These heat exchangers known in the prior art are substantially low efficiency type heat exchangers which only slightly warm the vapors before they are introduced into the engine. This prior art process of warming crankcase vapors and introducing them direct into the engines intake does not make them more significantly suitable for combustion. Some vapor removing or smog control devices are known in the art which utilize structurally complex heater-filter apparatus to treat crankcase vapors before introducing them into the intake portion of an engine. These devices have a disposible or cleanable filter therein which operates at an elevated temperature and which must be periodically removed and replaced or removed and cleaned to insure proper operation of the engine and the fumes treatment apparatus. Other smog control devices are known which have filters and the like for the crankcase fumes that are used with a series of control valves and vapor filters to treat the vapors before introducing same into the intake portion of the engine, generally these devices also utilize filter structures which must be periodically removed and cleaned or removed and replaced.

In an embodiment of the crankcase fumes treatment apparatus of this invention, such includes a crankcase vapors trap communicably connected with an internal combustion engine between the crankcase thereof and the intake manifold thereof. The crankcase vapors trap has an inlet and an outlet connected by conduits with the inlet connected with the crankcase and the outlet connected to the intake manifold. The crankcase vapors trap is a sealable container with a liquid storage reservoir portion, a sealable opening and an upper portion to receive crankcase vapors for separating liquid portions thereof from gaseous portions thereof and passing the resulting vapors from the outlet to the intake manifold of the engine via a conduit. In another embodiment of the crankcase fumes treatment apparatus of this invention, such includes a crankcase vapors trap having an inlet and an outlet with the inlet connected by a conduit to the crankcase of an internal combustion engine and a heat exchanger apparatus with the exhaust manifold of the engine communicably connected between the crankcase vapors trap outlet and the intake manifold. The heat exchanger apparatus has a conduit mounted with the exhaust manifold which is heated by direct heat exchange with the exhaust gases. A conduit connects the vapors trap outlet to the heat exchanger inlet and another conduit connects the heat exchanger outlet with the engines intake manifold. The crankcase vapors trap separates liquid portions from gaseous portions of crankcase vapors and passes the resulting vapors to the heat exchangers apparatus. The heat exchanger apparatus substantially heats the crankcase vapors and passes the resulting vapors into the engines intake manifold.

One object of this invention is to provide a crankcase fumes treatment apparatus overcoming the aforementioned disadvantages of the prior art devices.

Still, another object of this invention is to provide a crankcase fumes treatment apparatus having a crankcase vapors trap communicably connected with an internal combustion engine between the crankcase and the intake manifold which in use will pass crankcase vapors into the crankcase vapors trap and therein separate liquid portions thereof from gaseous portions thereof and pass the resulting vapors into the intake manifold of the connected engine.

Still, another object of this invention is to provide a crankcase fumes treatment apparatus having a crankcase vapors trap with the inlet thereof communicably connected with the crankcase of an internal combustion engine and having a heat exchanger apparatus with the exhaust manifold of the engine, the heat exchanger being communicably connected to receive vapors from the crankcase vapors trap and communicably connected with the intake manifold and pass heated vapors into the intake manifold of the connected engine.

Yet, another object of this invention is to provide a crankcase fumes treatment apparatus having a heat exchanger apparatus that has a conduit secured therewith the exhaust manifold mounted extending therethrough to be heated by direct heat exchange from exhaust gases passing through the exhaust manifold.

Yet, another object of this invention is to provide a crankcase fumes treatment apparatus having a crankcase vapors trap which has a reservoir portion to temporarily store liquid portions removed from crankcase vapors passed therethrough and having a sealable and openable opening for removal of separated liquid material stored therein.

Various other objects, advantages and features of the invention will become apparent to those skilled in the art from the following discussion taken in conjunction with the accompanying drawing, in which:

FIG. 1 is a front elevation view of an internal combustion engine having the crankcase vapors trap and heat exchanger of this invention;

FIG. 2 is a front elevation view of an internal combustion engine having the crankcase vapors of this invention;

FIG. 3 is an elevation view of a crankcase vapors trap having conduit segments connected to the inlet and the outlet thereof and having portions of the trap cutaway for clarity; and FIG. 4 is a perspective view of the exhaust manifold for the engine shown in FIG. 1 with the heat exchanger apparatus having conduit segments connected with the heat exchanger.

The following is a discussion and description of preferred specific embodiments of the crankcase fumes treatment apparatus of this invention, such being made with reference to the drawings whereupon the same reference numerals are used to indicate the same or similar parts and/or structure. It is to be understood that such discussion and description is to not unduly limit the scope of the invention.

The crankcase fumes treatment apparatus of this invention is disclosed, herein in two embodiments thereof. An embodiment, (1), of the crankcase fumes treatment apparatus of this invention is shown in FIG. 1 and generally indicated by the numeral 10; such includes a crankcase vapors trap 12 and a heat exchanger apparatus 14 communicably connected in series between the crankcase and the intake manifold of an internal combustion engine 16 with the heat exchanger connected to pass vapors into the intake manifold of the engine 16. In another embodiment, (2), of the crankcase fumes treatment apparatus of this invention, such is shown in FIG. 2 and generally indicated at 18; it includes a crankcase vapors trap communicably connected between the crankcase of an internal combustion engine 22 and the intake manifold of the engine 22.

Refering to the drawings in detail and in particular to FIG. 1, an embodiment, (1), of the crankcase fumes treatment apparatus 10 of this invention is shown therein. The engine 16 as shown is a V-type overhead valve reciporcating internal combustion engine representative of conventional and popular styles of engines with which the crankcase fumes treatment apparatus of this invention can be used. The engine 16 has a crankcase 24, a crankcase vent or outlet 26, an intake manifold 28, a carburetor 30, a carburetor base member or connector member 32 having an auxiliary inlet 34 that is communicably connected with the cavity of the intake manifold, and an exhaust manifolds 36. The carburetor base member 32 or connector member provides an inlet to the intake manifold 28. Depending upon the particular engine on which the crankcase fumes treatment apparatus 10 of this invention is used, the base member or connector member 22 may or may not be necessary if the carburetor or intake manifold has an auxiliary inlet which can be used to connect the apparatus of this invention.

FIG. 3 shows in detail a crankcase vapors trap indicated at 12. The crankcase vapors trap 12 is a sealable and openable container having an inlet 40 and an outlet 42 with a cavity therein comprised of an upper cavity portion indicated generally at 44 and a lower cavity portion or liquid reservoir portion indicated generally at 46. The outer structure of the vapors trap 12 has a side wall 48 with an integral bottom 50 and a removably mounted cover 52 on the top portion of the wall 48. The inlet 40 is through the side wall 48 in the upper cavity portion 44. The cover 42 has a peripheral portion 54 and a seal 56 contacting the upper portion 58 of the side wall 48 to seal the cover 52 therewith in a removable sealed relation. The outlet portion of the trap structure 12 has a conduit 60 connected with the outlet 42 and extending upright through the cavity of the container as shown. A bolt 42 through the cover 52 secures the cover 52 with the upper end of the container side wall 48. An aperture 64 in the upper portion of the conduit member 60 provides for fluid communication between the upper cavity portion 44 and the outlet 42 via the conduit member 60 as shown in FIG. 3. The conduit aperture 64 is spaced substantially above the reservoir portion of the container and is preferably oriented as shown approximately 90° relative to the inlet 40. In use the crankcase vapors trap 12 can be secured by any suitable means to a supporting structure preferably in an upright position as shown in FIG. 3. For use of the crankcase fumes treatment apparatus fumes with an automobile or the like the crankcase vapors trap structure is preferably mounted in the engine vehicles compartment. Fixtures are provided at the inlet 40 and the outlet 42 for the connection of conduits, such as flexible hoses. The structure of the crankcase vapors trap 12 as shown in FIG. 3 illustrates one structural configuration of the trap. It is to be understood that the specific structure of the trap shown can be modified from that shown without substantially providing for the scope of the invention. Important features of the crankcase vapors trap 12 are that it is a sealable container openable for removal of liquid material, that it has an inlet and an outlet in a portion thereof substantially separated from the liquid reservoir portion thereof and that it is connectable with conduits for joining same with the crankcase fumes treatment apparatus and such is easily mountable.

FIG. 4 shows in detail an exhaust manifold and heat exchanger apparatus. The exhaust manifold 36 as shown is an exhaust manifold from the engine shown in FIG. 1 and such is intended to illustrate an exhaust manifold of the type used on engines such as the engine 16. The exhaust manifold 86 has three inlet ports indicated at 70, 72 and 74 with the larger port 72 being in the center thereof. Connecting conduit portions 76 and 78 joined the outer ports 70 and 74 respectively to the manifold center portion 80. An exhaust manifold outlet portion from the manifolds center portion 80 has a flange 82 for connecting the exhaust manifold 36 with an appropriate exhaust conduit system for further treatment or sound muffling of the exhaust gases before discharging same into the atmosphere. The heat exchanger 14 has a conduit 84 with an inlet 86 and an outlet 88, shown in the dashed lines in FIG. 1. The conduit 84 is secured with the exhaust manifold so as to extend therethrough in a mid-portion of a passageway or conduit thereof so exhaust gases passing through the exhaust manifold will heat the conduit 84 by direct heat exchange. Vapors passing through the conduit 84 are heated by direct heat exchange with the wall of the conduit 84. The heat exchanger conduit 84 is secured with the exhaust manifold 36 in a sealed manner, such as by welding, to prevent exhaust gas from leaking around the conduit 84. FIG 4 shows the exhaust manifold heat exchanger 14 mounted through a conduit 76 connecting an outer port 70 and a center port 72 of the exhaust manifold 36. It is to be understood that the heat exchange or conduit 84 can be mounted with an exhaust manifold other than the manifold shown and constructed to compensate for structural differences in the exhaust manifolds as they vary structurally between for different makes and types of engines. The exhaust manifold heat exchanger conduit 84 can also be mounted to extend therethrough a portion of an exhaust manifold other than a conduit segment of an exhaust manifold, for example, it can be mounted extending through the center portion of an exhaust manifold or through a portion thereof spanning the length of the manifold and thus provide a greater area for the heat exchange to take place.

FIG. 1 shows the crankcase fumes treatment apparatus of this embodiment, (1), connected with the engine 16. A first conduit 90 connects the crankcase vent outlet 26 with the crankcase vapors trap inlet 40. A second conduit 92 connects the crankcase vapors trap outlet 42 with the heat exchanger conduit inlet 86. A third conduit 94 connects the heat exchanger conduit outlet 88 with the intake manifold inlet 34. When the engine 16 is in operation under most operating conditions the pressure in the crankcase 34 is substantially atmospheric pressure and the pressure in the intake manifold is substantially below atmospheric pressure and below the pressure in the crankcase; it is this pressure differential which moves vapors from the crankcase 24 through the crankcase fumes treater apparatus 10 into the intake manifold 28. During operation of the engine crankcase vapors or fumes are removed from the crankcase 24, passed through the outlet 26 and through the first conduit 90 into the crankcase vapors trap inlet 40. Once the crankcase vapors are inside the crankcase vapors trap 12, the liquid portions thereof separate from the gaseous portions thereof with the liquid portions dropping to the lower cavity portion a reservoir portion 46 as shown in FIG. 3 and the gaseous portions thereof remaining in the upper cavity portions 44. Vapors leaving the crankcase vapors trap 12 move through the aperture 64 and the outlet conduit member 60 through the outlet 42 and into the second conduit 92. As the resulting vapors from the vapors trap 12 move through the heat exchanger 14 and to particularly the conduit portion 84 within the exhaust manifold 36 the vapors are heated by direct heat exchange with the conduit wall and are passed out the conduit outlet 88 into the third conduit 94 whereupon they move into the intake manifold 28 through the inlet 34 into the carburetor base or connector member 32. The crankcase fumes treatment apparatus 10 functions to remove liquid portions of crankcase vapors, heat same substantially and direct same into the intake manifold of the internal combustion engine. The crankcase fumes treatment apparatus 10 functions to provide a means of treating crankcase vapors before introducing same into an engine by removing liquid portions of the vapors and heating the resulting vapors thereby making them more acceptable to the combustion process of the engine.

Another embodiment, (2), of the crankcase fumes treatment apparatus of this invention is shown in FIG. 2. This embodiment, (2), of the crankcase fumes treatment apparatus is generally indicated at 18 and includes a crankcase vapors trap, indicated at 20, connected with an internal combustion engine, indicated at 22.

The engine 22 is the same as the engine 16 of the first described embodiment, (1), and similar parts of the engine 22 bear the same numerals as the engine 16. The engine 22 has a crankcase 24 with a vent outlet 26, and an intake manifold 28, a carburetor 30 with a connector member or base 32, and an inlet 34 into the carburetor base member 32, and exhaust manifolds 36. The crankcase vapors trap 20 is structurally the same as the crankcase vapors trap 12 shown and described in conjunction with the first described embodiment, (1), of the crankcase fumes treatment apparatus of this invention. The crankcase vapors trap 20 has the specific elements thereof bearing the same numerals as the crankcase vapors trap 12. The crankcase vapors trap 20 includes an openable and closable sealable container with an upright sidewall 48, a bottom 50, an outlet 42, and inlet 40 and a removably mounted cover member 52. The crankcase vapors trap 20 has an upper interior cavity portion 44 and a lower reservoir cavity portion 46. The crankcase vapors trap 20 is preferably mounted by any suitable means in the vacinity of the engine 22. In the case of an automobile, or other vehicle the trap 20 is preferably mounted in the engine compartment of the vehicle. A first conduit 98 connects the crankcase outlet 26 with the crankcase vapors trap inlet 40. A second conduit 100 connects the crankcase vapors trap outlet 42 to the intake manifold inlet 34 and the carburetor assembly portion of the engine 22.

In use and operation of the crankcase vapors treatment apparatus 18 of this embodiment, (2), of this invention it functions to communicate crankcase vapors from the engine crankcase 24 to the intake manifold 28 through the conduits and vapors trap 20 thereof. The crankcase vapors move through the fumes treatment apparatus 18 during normal operation of the engine 22 due to the differential pressure between the interior of the intake manifold 28 and the crankcase 24. During operation of the engine 22 crankcase vapors are moved through the treatment apparatus 18 by being drawn through the conduit 98 into the upper portion of the crankcase vapors trap 20 and at such time liquid portions of the vapors settle to the bottom or reservoir portion of the trap 50, while the gaseous portions of the vapors pass on through the trap 20 exiting same at the outlet 42. The vapors resulting from passage through the trap 20 have a substantially smaller quanity of liquid portions than do the vapors entering the trap. The resulting vapors are moved through the conduit 100 by the reduced pressure in the intake manifold 28 and pass into the intake manifold through the inlet 34. The crankcase fumes treatment apparatus 18 functions to make the vapors passing into the intake portion of the engine more acceptable to the combustion process then vapors directly removed from the crankcase. The crankcase fumes treatment apparatus 18 of this embodiment, (2), of this invention makes crankcase vapors more acceptable to the combustion process and removes liquid portions of the crankcase vapors which inturn reduces atmospheric pollution due to operation of an internal combustion engine by lessening the amount of substantially non-combustible materials introduced into the combustion process and passed through the engine.

In the manufacture of the crankcase fumes treatment apparatus of this invention, it is obvious that the apparatus can be constructed to achieve the end product and to function as described. The specific structure of the crankcase vapors trap provides a vapor separating portion or a vapor receiving portion and a liquid storage or reservoir portion within a sealable and openable container. The trap is constructed so as to be easily mountable by any suitable means in the vicinity of an internal combustion engine for example in the engine compartment of the vehicle. The trap is openable for removal of the separated liquid portions of the crankcase vapors. In the embodiment of the crankcase fumes treatment apparatus having the heat exchanger, such is a structure which is easily incorporated with the exhaust manifold of an internal combustion engine. The heat exchanger is constructed for a maximum transfer of heat between the exhaust gases and the vapors within the heat exchanger conduit.

In the use and operation of the crankcase fumes treatment apparatus of this invention, it is seen that same provides an apparatus for the treatment of crankcase fumes or vapors that are removed from the crankcase internal combustion engine prior to their introduction into the intake manifold of the engine. The crankcase fumes treatment apparatus functions to make the crankcase fumes or vapors acceptable to the combustion process in an engine. The apparatus provides for removing crankcase vapors of an internal combustion engine, separating liquid portions and gaseous portions and passing the gaseous portions into the intake of the engine. It also provides for substantially heating vapors before passing them into the engine intake.

As it will become apparent from the foregoing description of the applicants crankcase fumes treatment apparatus relatively simple and inexpensive means have been provided to treat crankcase fumes of an internal combustion engine and introduce same to the intake portion of the engine. The crankcase fumes treatment apparatus is usable with a reciprocating internal combustion engines and other internal combustion engines to remove liquid portions of the crankcase vapors thereof and introduce same into the intake portion of the engine for passing through the combustion process thereof. The trap portion of the structure has a reservoir which can be opened for removal of the separated liquid portions of the vapors.

While the invention has been described in conjunction with preferred specific embodiments thereof, it will be undetstood that this description is intended to illustrate and not to limit the scope of the invention, which is defined by the following claims.

I claim:

1. In an internal combustion engine having a crankcase or the like, an intake manifold or the like and an exhaust manifold or the like, the improvement therewith of crankcase fumes treatment apparatus, comprising:

a. a crankcase vapors trap having an inlet and an outlet, said trap being a sealable and openable container and having a liquid storage reservoir therein, b. a conduit connected on one end to said trap inlet and connectable on its other end with said crankcase in fluid communication therewith, c. a heat exchanger means having a conduit mounted in said exhaust manifold and having an inlet and an outlet, d. a second conduit connected on one end to said trap outlet and connected on its other end to said heat exchanger inlet, e. a third conduit connected on one end to said heat exchanger outlet and connected on its other end to said intake manifold in fluid comunication therewith, and f. means with said crankcase vapors trap to separate liquid and gaseous fluids.

g. said heat exchanger has a conduit member secured therewith and extending therethrough, said conduit heated by direct heat exchange with exhaust gases from said engine, said trap has an upper cavity portion having said inlet thereinto and an outlet therefrom and a lower cavity portion to temporarily store liquid therein, and said heat exchanger conduit extends through a mid-portion of said exhaust manifold and is positioned so exhaust gases will flow around same, said trap has an upright sidewall with an integrally attached bottom, said inlet of said trap is through said side wall, said outlet of said trap is through said bottom and has an upright conduit member in said container extending upwardly from said bottom outlet through said lower cavity portion, said upright conduit having an inlet into same from said upper cavity portion, said crankcase fumes treatment apparatus being constructed and adapted to in use receive vapors from said crankcase through said first-named conduit, pass said vapors through said crankcase vapors trap and said means to separate liquid and gaseous fluids wherein liquid portions of said vapors are separated fron gaseous portions thereof and resulting vapors are passed to said heat exchanger means via said second conduit, said heat exchanger means substantially heating said resulting vapors and passing same into said intake manifold via said third conduit and resulting liquid is stored in said reservoir.

* * * * *